Sept. 12, 1967  E. C. LEWIS  3,341,116
LITTER BAG FOR AUTOMOTIVE VEHICLES
Filed May 6, 1966
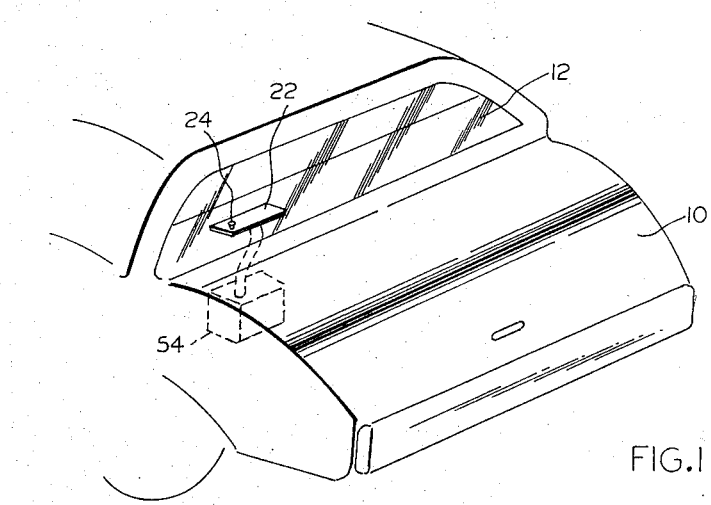
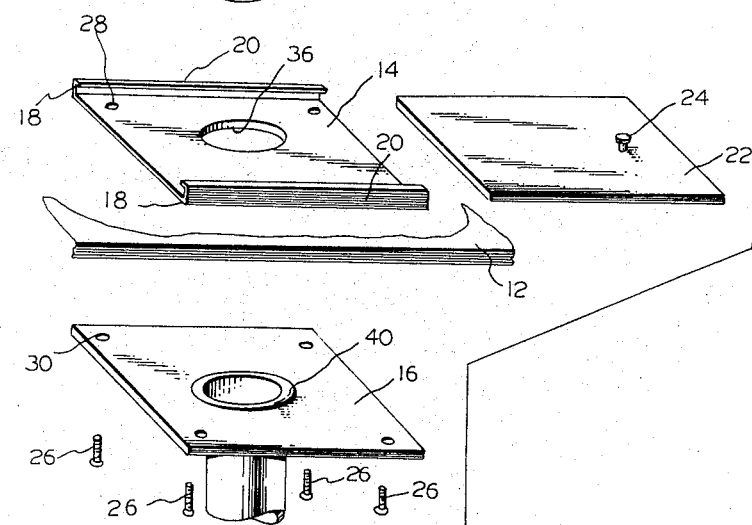
INVENTOR
EARL C. LEWIS
BY 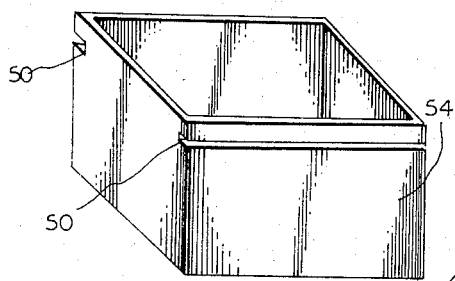
ATTORNEYS

United States Patent Office 3,341,116
Patented Sept. 12, 1967

3,341,116
LITTER BAG FOR AUTOMOTIVE VEHICLES
Earl C. Lewis, 1416 E. Parker St.,
Midland, Tex. 79701
Filed May 6, 1966, Ser. No. 548,206
1 Claim. (Cl. 232—43.2)

ABSTRACT OF THE DISCLOSURE

A secluded or hidden litter bag for an automobile having a pair of mounting plates disposed on a shelf, a cover plate for the mounting plates, an interfacing aperture extending coaxially through the pair of plates and covered by said cover plate, a flexible plastic tubing extending downwardly from said apertures to a remote distance from the pair of plates terminating in a litter box means of plastic material for resting on the floor within the automobile.

---

The present invention relates to a new and improved hidden litter bag for automotive vehicles, and more particularly relates to a type of litter bag that is generally hidden from view and is adapted to control larger amounts of litter and trash than conventional types of litter bags that are hung from and about the dashboard. Also the litter bag arrangement of the present invention is provided with a sliding cover so that it is closed off until the sliding cover is removed, which sliding cover is mounted on the rear shelf of the automobile, and a sliding cover and groove arrangement in the litter box is provided to enable the litter box to be removed for disposal of the trash when necessary.

The litter box is connected to the rear shelf by a plastic tubing sufficiently large to pass beverage cans and bottles as well as many other types of paraphernalia that would pass through a 3 or 4-inch diameter plastic tube.

An object therefore of the present invention is to provide a litter bag arrangement wherein the litter bag or box contains, or is adapted to contain larger amounts of litter, and the position thereof is remote and out of the way of passengers in the vehicle.

A further object of the present invention is to provide a litter bag having a plastic and flexible tubing between the shelf and the litter bag so that the litter bag may be variously positioned about the trunk of the vehicle in which it is mounted.

A further object of the invention is to provide a litter bag having a cover plate that is adapted to slide with restraint along a mounting plate, and will open by manual exertion, but will remain in its last position and thereby will not be seen to slide back and forth due to centrifugal forces applied to it due to turning or other movements of the vehicle.

The above and other objects and advantages of the invention will become apparent upon full consideration of the following detailed description and accompanying drawings in which:

FIGURE 1 shows a broken away perspective view of a rear portion of an automobile, showing the manner in which the hidden litter bag or box is mounted from the shelf of the vehicle, and in which the litter box is disposed within the trunk, in accordance with the preferred embodiment of the invention;

FIGURE 2 shows a generally exploded view of the various components of the apparatus comprising the hidden litter bag or box of the invention.

Referring now to the drawings, there is shown an automotive vehicle 10 having a rear shelf 12 on which there is mounted a pair of mounting or supporting plates 14, 16. The upper one of said pair of mounting plates has its opposite edges 18, 18 upward and inwardly turned or folded for forming a track 20, 20 for receiving in restrained sliding movement and engagement, a cover plate 22 which has a knob 24 so that it may be manually actuated along the tracks 20, 20 into and out of mating engagement with the upper plate 14. The plates 14, 16 are retained upon and onto the shelf 12 by a set of at least four rivets or screw members 26, 26, 26, 26 which fit into engagement with rivet holes 28, 30.

Through each of the plates 14, 16, as well as in mutual interfacing and mating relation with the shelf, there is a common hole or aperture 36 that extends completely therethrough for receiving used beverage cans, bottles, and the like. The diameter may be 3 or 4 inches, and there is secured to the aperture 36 a plastic tube 38 so that its upper end is provided with a flanged edge 40 that is secured to the plate 16 between the plate 16 and the shelf 12. The plastic tube 38 is of a polyethylene type material or any of various colors, and is generally flexible but retains substantially the cylindrical effect thereof so that it is always open for passage of articles inserted into the upper end thereof from the shelf 12 within the vehicle. The lower end of the tube terminates similarly by a flanged lip within a litter box or bag cover lid 44. The cover lid has down and inturned opposite edges forming tracks 48, 48 somewhat similar to the tracks of the plate 14, so that the tracks 48, 48 are adapted to engage recesses 50, 50 within the opposite sides of the upper edges of a litter box 54. The litter box is provided so that the tracks 50, 50 thereof engage the tracks 48, 48 of the lid 44 in restrained sliding movement, so that the box 54 does not slide off of the lid or vice versa upon movements of the vehicle. In lieu of box 54, the tube 38 may terminate in any type of plastic polyethylene or other plastic material which are presently and of conventional construction as available commercially.

The box 54 is adapted by reason of the length and flexibility of the plastic tubing 38 to be remotely and variously positioned about the trunk of the automotive vehicle 10, so that it is not in one's way when the trunk is otherwise used.

Additional embodiments of the invention in this specification will occur to others and therefore it is intended that the scope of the invention be limited only by the appended claims and not by the embodiments described hereinabove. Accordingly reference should be made to the following claims in determining the full scope of the invention.

What is claimed is:

A hidden litter bag for an automotive vehicle comprising a pair of mounting plates for mounting on a shelf of an automotive vehicle, a cover plate generally the size of the pair of mounting plates, the upper one of said pair of plates having upturned and inwardly extending opposite edges for receiving restrained sliding movement of said cover plate, an interfacing aperture extending coaxially through said pair of plates and said shelf, a flexible plastic tubing of polyplastic material extending downwardly from said apertures to a remote distance from said pair of plates, the free end of said plastic tubing connecting with a litter box cover lid having down-and-in turned opposite edges forming a track for receiving restrained sliding movement of a litter box means of plastic material for resting on the floor within said automotive vehicle.

References Cited

UNITED STATES PATENTS

| | | | |
|---|---|---|---|
| 1,897,717 | 2/1933 | Appel | 232—43.2 |
| 2,059,105 | 10/1936 | Heisenfeldt | 232—43.2 |
| 2,710,686 | 6/1955 | Trammell. | |
| 2,793,092 | 5/1957 | Peterson. | |
| 2,891,662 | 6/1959 | Frost. | |
| 2,920,756 | 1/1960 | Evenson. | |

FRANCIS K. ZUGEL, *Primary Examiner.*